(12) United States Patent
Herman et al.

(10) Patent No.: US 11,592,559 B2
(45) Date of Patent: Feb. 28, 2023

(54) VEHICLE SENSOR FUSION

(71) Applicant: Ford Global Technologies, LLC, Dearborn, MI (US)

(72) Inventors: David Michael Herman, Oak Park, MI (US); Aaron Lesky, Ypsilanti, MI (US); Ronald Beras, Warren, MI (US); Ashwin Arunmozhi, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 449 days.

(21) Appl. No.: 16/798,702

(22) Filed: Feb. 24, 2020

(65) Prior Publication Data
US 2021/0263154 A1   Aug. 26, 2021

(51) Int. Cl.
  *G01S 17/26*   (2020.01)
  *G01S 17/931*   (2020.01)
  (Continued)

(52) U.S. Cl.
  CPC ............ *G01S 17/26* (2020.01); *G01S 7/4808* (2013.01); *G01S 7/4972* (2013.01); *G01S 17/931* (2020.01); *G06N 3/0454* (2013.01)

(58) Field of Classification Search
  CPC .... G01S 17/26; G01S 17/931; G01S 17/4808; G01S 17/4972; G01S 7/4808; G01S 7/4972
  See application file for complete search history.

(56) References Cited

U.S. PATENT DOCUMENTS

| 9,052,721 | B1 | 6/2015 | Dowdall et al. |
| 11,151,394 | B2 * | 10/2021 | Schroeter ................. G06T 7/50 |
| 2020/0408887 | A1 * | 12/2020 | Zeng ..................... G01S 7/4808 |

FOREIGN PATENT DOCUMENTS

| CN | 103644917 B | 1/2016 |
| CN | 109975792 A | 7/2019 |
| KR | 1020190104304 A | 9/2019 |

* cited by examiner

Primary Examiner — Bryan Bui
(74) Attorney, Agent, or Firm — Frank A. MacKenzie; Bejin Bieneman PLC

(57) ABSTRACT

A computer, including a processor and a memory, the memory including instructions to be executed by the processor to obtain velocity lidar point cloud data acquired with a frequency modulated continuous wave (FMCW) lidar sensor, wherein the velocity lidar point cloud data includes a speed with which a data point is moving with respect to the FMCW lidar sensor, filter the velocity lidar point cloud data to select static velocity data points, wherein the static velocity data points are velocity data points each correspond to a point on a roadway around a vehicle. The instructions can include further instructions to determine FMCW lidar sensor accelerations in six degrees of freedom based on the static velocity lidar data points and determine FMCW lidar sensor rotations and translations in six degrees of freedom based on the FMCW lidar sensor accelerations in six degrees of freedom. The instructions can include further instructions to determine vehicle rotations and translations in six degrees of freedom based on inertial measurement unit (IMU) data, determine FMCW lidar sensor mis-alignment based on comparing the FMCW lidar sensor rotations and translations with the vehicle rotations and translations and align the FMCW lidar sensor based on the FMCW lidar sensor mis-alignment. The instructions can include further instructions to operate a vehicle based on the aligned FMCW lidar sensor.

20 Claims, 6 Drawing Sheets

(51) Int. Cl.
*G01S 7/48* (2006.01)
*G01S 7/497* (2006.01)
*G06N 3/04* (2023.01)

VEHICLE SENSOR FUSION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

SUMMARY

Figure 1:
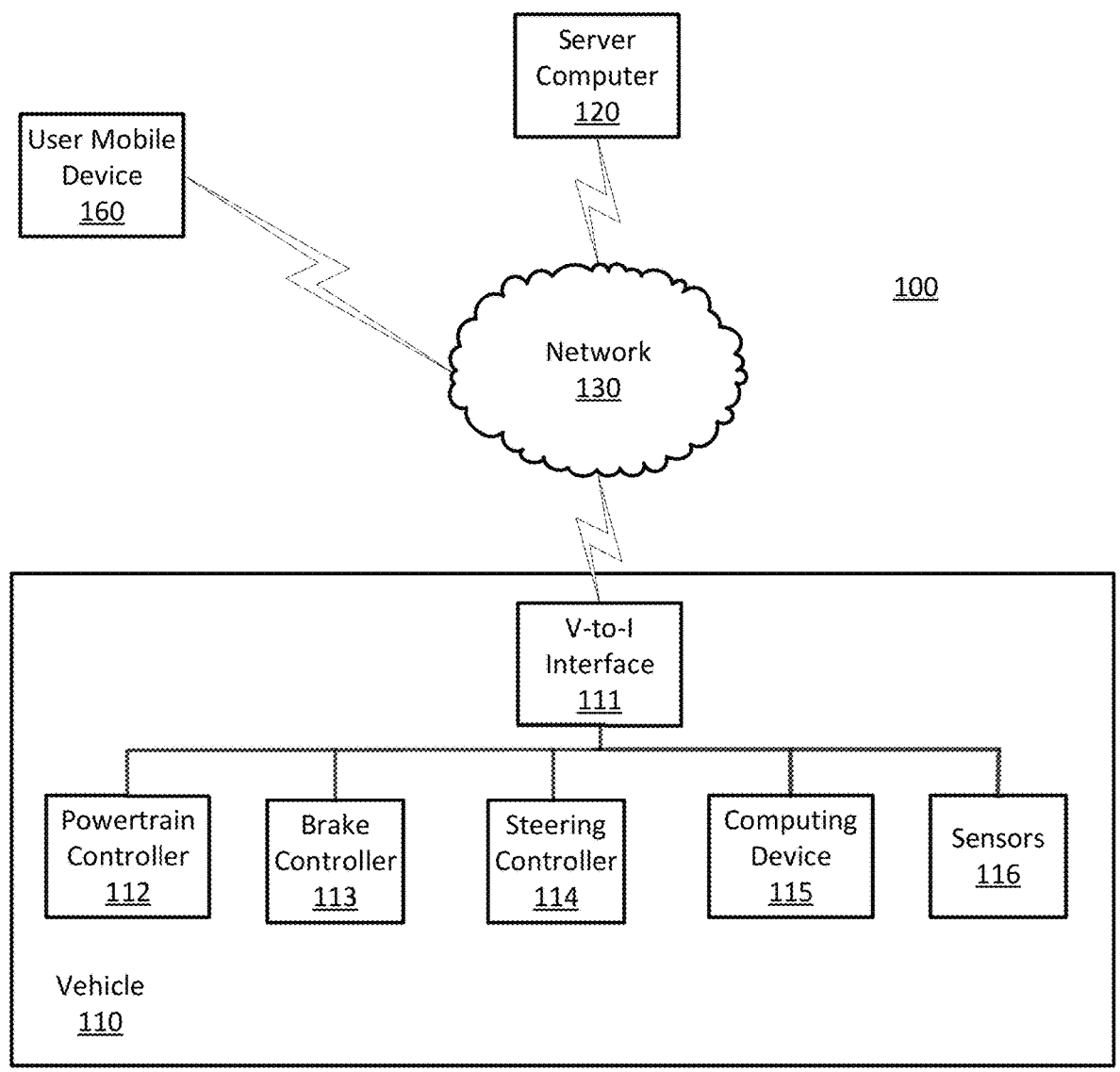
FIG. 1 is a diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A vehicle can be operated based on sensor data acquired by a plurality of vehicle sensors including a lidar sensor. Operating the vehicle based on sensor data acquired by a plurality of sensor including a lidar sensor can be enhanced by aligning the lidar sensor with respect to the vehicle on an ongoing basis as the vehicle is operated on a roadway, for example. Aligning the lidar sensor permits point cloud data acquired by the lidar sensor to be combined with other sensor modalities including video and radar sensor. Combining sensor data from different sensor modalities can be referred to as sensor fusion. Sensors can be initially aligned when a vehicle is manufactured; however, lidar sensors can be particularly sensitive to mis-alignment caused by vibration and/or shock experienced as a vehicle is operated on a roadway. Techniques described herein enhance sensor fusion by determining lidar sensor mis-alignment while a vehicle is being operated on a roadway based on inertial measurement unit (IMU) data and aligning the lidar sensor with respect to a vehicle in a real world coordinate system to permit point cloud data acquired by the lidar sensor to be accurately combined with other modality data.

Disclosed herein is method including obtaining velocity lidar point cloud data acquired with a frequency modulated continuous wave (FMCW) lidar sensor wherein the velocity lidar point cloud data includes a speed with which a data point is moving with respect to the FMCW lidar sensor and filtering the velocity lidar point cloud data to select static velocity data points, wherein the static velocity data points each correspond to a point on a roadway around a vehicle and determining FMCW lidar sensor accelerations in six degrees of freedom based on the static velocity data points. FMCW lidar sensor rotations and translations in six degrees of freedom can be determined based on the FMCW lidar sensor accelerations in six degrees of freedom and determining vehicle rotations and translations in six degrees of freedom can be based on inertial measurement unit (IMU) data. FMCW lidar sensor mis-alignment can be determined based on comparing the FMCW lidar sensor rotations and translations with the vehicle rotations and translations, aligning the FMCW lidar sensor can be based on the FMCW lidar sensor mis-alignment, and the vehicle can be operated based on the aligned FMCW lidar sensor. Acquiring velocity lidar point cloud data can be based on movement of the FMCW lidar sensor. Acquiring velocity lidar point cloud data can be based on a doppler shift. Acquiring the velocity lidar point cloud data can be based on acquiring two data points from a location in an environment around the FMCW lidar sensor at different times to measure acceleration.

Filtering the velocity lidar point cloud data to select the static velocity data points can be based on providing the velocity lidar point cloud data to a first neural network. The static velocity data points can be selected by filtering out dynamic data points using a second neural network where the dynamic data points are data points acquired from objects that are moving with respect to a background. Dynamic data points can be filtered out by performing spatial filtering of data points on or near a moving object with the second neural network. The static velocity data points can be filtered based on processing the static velocity data points with a Savitzky-Golay filter to smooth the static velocity data, wherein the Savitzky-Golay filter convolves the velocity data points with a polynomial function. The FMCW lidar sensor rotations and translations in six degrees of freedom and the vehicle rotations and translations can be based on transfer functions determined based on finite element analysis simulations of FMCW lidar sensor and simulated vehicle rotations and translations under varying load inputs with varying vibration modes. The transfer functions can include IMU translations and rotations in six degrees of freedom. The transfer functions can be implemented with a second neural network. The transfer functions can account for differences in varying stiffness of vehicle structures upon which the FMCW lidar sensor and the IMU are mounted. The vehicle can be operated by determining a vehicle path based on point cloud data obtained from the aligned FMCW lidar sensor. The vehicle can be operated by controlling vehicle powertrain, vehicle steering and vehicle brakes to cause the vehicle to travel along the vehicle path.

Further disclosed is a computer readable medium, storing program instructions for executing some or all of the above method steps. Further disclosed is a computer programmed for executing some or all of the above method steps, including a computer apparatus, programmed to include obtaining velocity lidar point cloud data acquired with a frequency modulated continuous wave (FMCW) lidar sensor wherein the velocity lidar point cloud data includes a speed with which a data point is moving with respect to the FMCW lidar sensor, and filter the velocity lidar point cloud data to select static velocity data points, wherein the static velocity data points each correspond to a point on a roadway around a vehicle and determining FMCW lidar sensor accelerations in six degrees of freedom based on the static velocity data points. FMCW lidar sensor rotations and translations in six degrees of freedom can be determined based on the FMCW lidar sensor accelerations in six degrees of freedom and determining vehicle rotations and translations in six degrees of freedom can be based on inertial measurement unit (IMU) data. FMCW lidar sensor mis-alignment can be determined based on comparing the FMCW lidar sensor rotations and translations with the vehicle rotations and translations, aligning the FMCW lidar sensor can be based on the FMCW lidar sensor mis-alignment, and the vehicle can be operated based on the aligned FMCW lidar sensor. Acquiring velocity lidar point cloud data can be based on movement of the FMCW lidar sensor. Acquiring velocity lidar point cloud data can be based on a doppler shift. Acquiring the velocity lidar point cloud data can be based on acquiring two data points from a location in an environment around the FMCW lidar sensor at different times to measure acceleration.

The computer can be further programmed to filter the velocity lidar point cloud data to select the static velocity data points based on providing the velocity lidar point cloud data to a first neural network. The static velocity data points can be selected by filtering out dynamic data points using a second neural network where the dynamic data points are data points acquired from objects that are moving with respect to a background. Dynamic data points can be filtered out by performing spatial filtering of data points on or near a moving object with the second neural network. The static velocity data points can be filtered based on processing the static velocity data points with a Savitzky-Golay filter to smooth the static velocity data, wherein the Savitzky-Golay filter convolves the velocity data points with a polynomial function. The FMCW lidar sensor rotations and translations in six degrees of freedom and the vehicle rotations and translations can be based on transfer functions determined based on finite element analysis simulations of FMCW lidar sensor and simulated vehicle rotations and translations under varying load inputs with varying vibration modes. The transfer functions can include IMU translations and rotations in six degrees of freedom. The transfer functions can be implemented with a second neural network. The transfer functions can account for differences in varying stiffness of vehicle structures upon which the FMCW lidar sensor and the IMU are mounted. The vehicle can be operated by determining a vehicle path based on point cloud data obtained from the aligned FMCW lidar sensor. The vehicle can be operated by controlling vehicle powertrain, vehicle steering and vehicle brakes to cause the vehicle to travel along the vehicle path.

DETAILED DESCRIPTION

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160. Server computer 120 can also function as a computing device 115 included in an edge computing node, where an edge computing node is a computing device 115 that acquires sensor data and communicates with vehicles 110 in a local portion of one or more of a roadway, parking lot or parking structure, etc.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
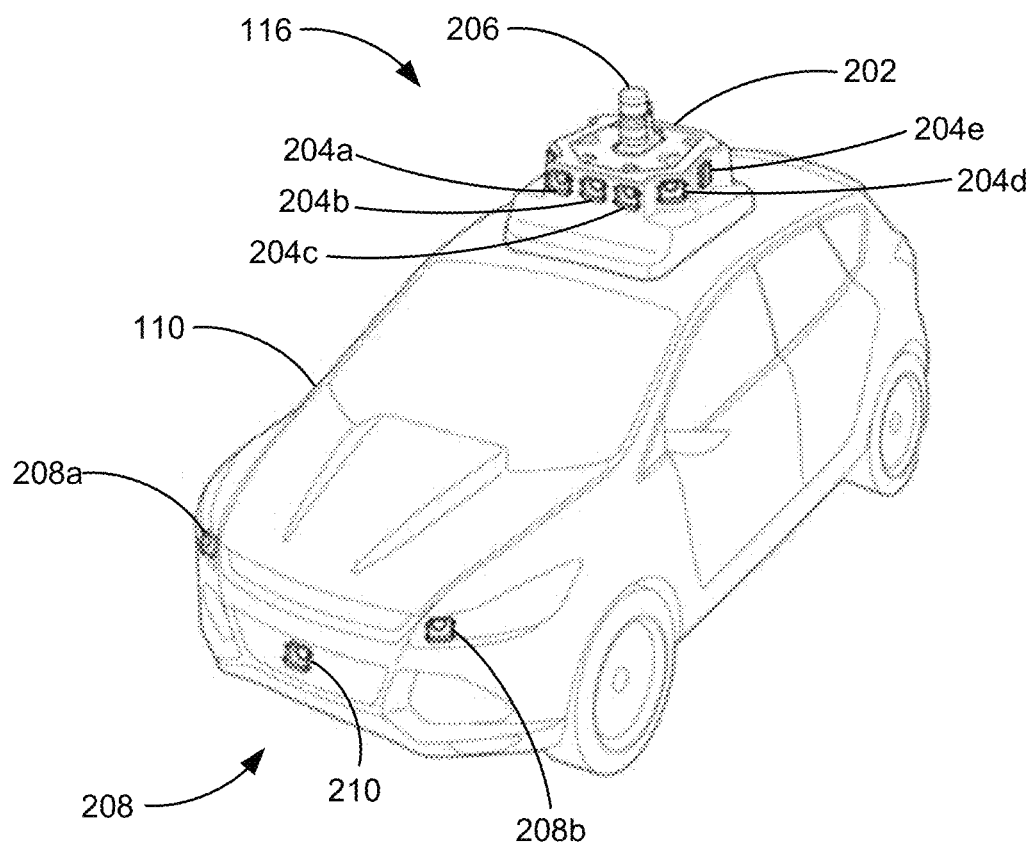
FIG. 2 is a diagram of an example vehicle including sensors.

FIG. 2 is a diagram of a vehicle 110 including sensors 116. Some sensors 116 can be mounted to the vehicle in a sensor pod 202, in this example attached to a roof portion of the vehicle 110. The sensor pod 202 is a physical structure mounted, i.e., fixedly attached, to a portion of a vehicle 110 such as a roof, and to which sensors 204, 206 can be mounted and/or in which sensors 204, 206 can be included. The pod 202 can include one or more lidar sensors 206 and video sensors 204a, 204b, 204c, 204e (collectively video sensors 204). Mounting sensors 116 in a sensor pod 202 can permit the sensors 116 to be initially aligned prior to mounting on the vehicle 110. Initial alignment of sensors 116 includes determining a six axis location and orientation for each of the sensors. Sensors 116 included in a sensor pod 202 can be initially aligned with respect to the sensor pod 202 and therefore to each other, and then when the sensor pod 202 is attached to vehicle 110 the sensors 116 included in the sensor pod 202 can be initially aligned to the vehicle 110. Vehicle 110 can include sensors 116 in addition to sensors 116 included in a sensor pod 202. Vehicle 110 can include radar sensors 208a, 208b, 208c, collectively radar sensors 208 mounted at locations on the body of vehicle 110. These sensors 116 can be initially aligned after mounting on a vehicle 110. Initial alignment can include acquiring sensor data from each sensor that includes a fiducial marker, for example. Once a vehicle 110 begins operation, mechanical movement and vibrations can mis-align the sensors 116 with respect to the vehicle 110 and each other in spite of the initial alignment. Techniques disclosed herein can enhance sensor alignment by determining when sensors 116 are mis-aligned and re-align the sensors 116 while a vehicle 110 is operating without requiring external alignment targets or procedures that would interrupt vehicle 110 operation.

Lidar sensor 206 can operate as a frequency modulated continuous wave (FMCW) lidar. FMCW lidars emit optical radiation, typically at infrared wavelengths as a continuous wave rather than pulses, as some lidar sensor emit. Pulse emitting lidar sensors can emit short-duration (<one microsecond) pulses of optical energy and measure the time it takes for the pulse to be reflected from surfaces in the environment and travel back to the sensor to be detected. FMCW lidars emit a continuous wave of optical energy, modulated at a frequency below the frequency of the light energy itself, for example about one gigaHertz. An FMCW lidar can measure a phase shift in the reflected and returned optical energy and thereby determine a distance from the sensor to the surface that reflected the optical energy. An FMCW lidar can also measure a frequency shift in the returned signal to determine a doppler shift and thereby determine the relative motion of the sensor with respect to the surface in the environment. The ability to measure doppler shifts permits an FMCW lidar to be used to determine the difference between background data points, for example lidar data points corresponding to a roadway around a moving vehicle, and lidar data points reflected by moving objects around a moving vehicle, for example other vehicles in traffic.

Figure 3:
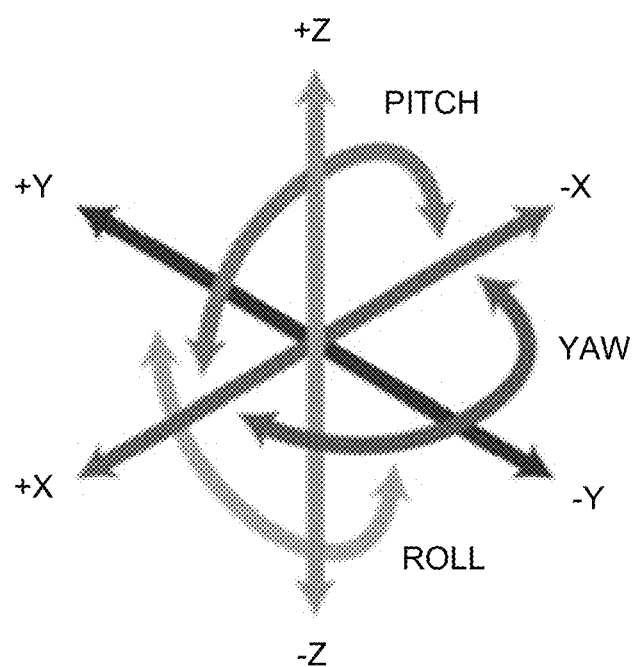
FIG. 3 is a diagram of example six axis coordinate labels.

FIG. 3 is a diagram of six degree of freedom (DoF) pose coordinates 300. Each sensor 116 can be aligned mechanically and electronically with respect to x, y, and z location coordinates determined with respect to x, y, and z orthogonal axes and roll, pitch, and yaw rotational coordinates, each determined with respect to an x, y, and z axis respectively. Sensor 116 alignment determines a location and orientation for each data point produced by a sensor with respect to the same real world coordinate system. The real world coordinate system can be a global coordinate system such as latitude, longitude and altitude or a local coordinate system determined with respect to x, y, and z orthogonal axes defined with respect to a vehicle 110. For example the x, y, and z orthogonal axes can be defined with respect to a selected point on a vehicle 110, for example the center of gravity of the vehicle 110, and where the x axis passes through the center of gravity parallel to the direction of travel of the vehicle 110 with steerable wheels aligned straight, the y axis is defined to be perpendicular to the direction of travel, whereby the x and y axes define a substantially horizontal plane when the vehicle 110 is on a substantially flat surface, and the z axis perpendicular to a roadway surface that supports the vehicle 110, i.e., straight up, that is to say, substantially vertically when the vehicle 110 is on a substantially flat surface.

Figure 4:
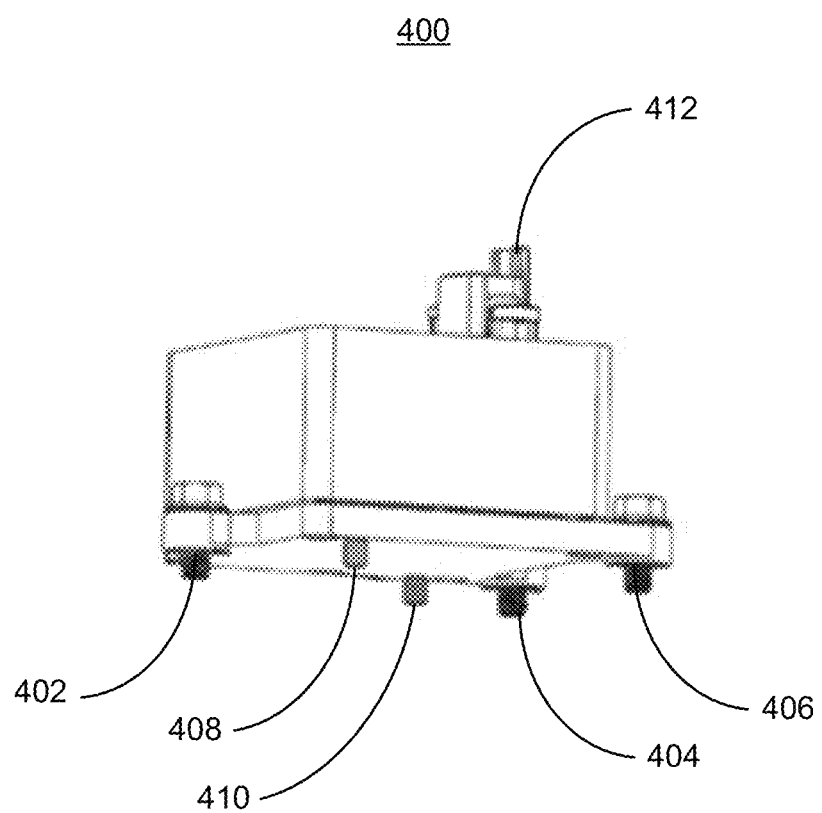
FIG. 4 is a diagram of an example inertial measurement unit.

FIG. 4 is a diagram of an inertial measurement unit (IMU) 400. A six DoF pose for a vehicle 110 can be determined by an IMU attached to a vehicle 110. An IMU can determine a six DoF pose for a vehicle using three accelerometers and three gyroscopes to measure motion in six DoF coordinates 300. Integrating acceleration measurements with respect to six DoF coordinates 300 over time can yield displacements in x, y, and z and rotations in roll, pitch, and yaw. An IMU 400 can be attached to a vehicle 110 at attachment point 402, 404, 406, which can be bolts that attach the IMU 400 to a surface in the vehicle 110. The IMU 400 can include alignment pins 408, 410 which can be used to precisely align the IMU 400 to the vehicle 110. Alignment pin 410 is the point on IMU 400 closest to the point of percussion, which, for IMU 400 can correspond to the point of origin for the three accelerometer axes. Six DoF displacement and rotation data can be communicated from IMU 400 to a computing device 115 included in a vehicle 110 via a cable attached to connector 412. Because alignment of IMU 400 can be precisely determined with respect to the vehicle 110, sensors 116 including lidar sensors 206, video sensors 204 and radar sensors 208 can be aligned to the IMU 400 and therefore aligned to the vehicle 110 and thereby to each other.

Figure 5:
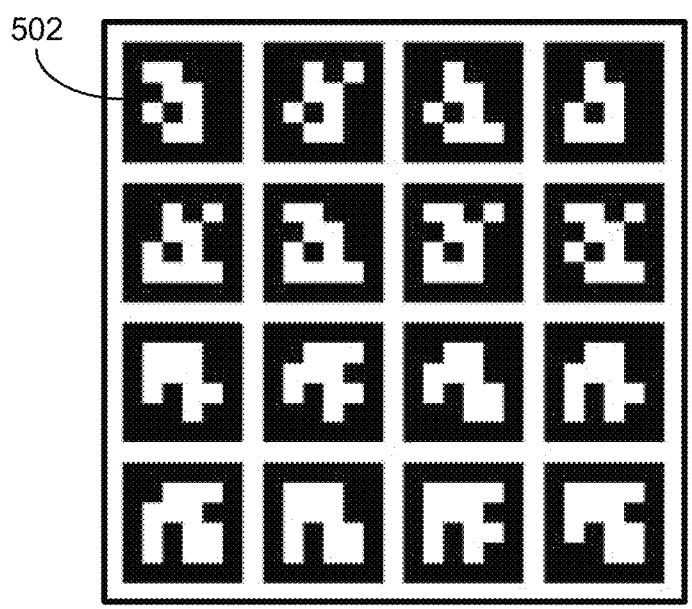
FIG. 5 is a diagram of an example external alignment target.

FIG. 5 is a diagram of an external alignment target 500. An external alignment target 500 can include a number of ArUco fiducial marks 502, for example. ArUco fiducial marks 502 are two-dimensional (2D) patterns from a library of fiducial marks described at www.uco.es/grupos/ava/node/26, "Aplicaciones de la Vision Artificial", University of Cordoba, Spain, May 15, 2019. ArUco fiducial marks can be processed by machine vision software that can determine a 3D six DoF pose in pixel coordinates for each ArUco fiducial mark 502 included in an external alignment target 500 by processing sensor 116 data that includes the external alignment target 500. By determining a six DoF pose for each ArUco fiducial mark 502 included in sensor data that includes an external alignment target 500, the machine vision software can determine an accurate six DoF pose in spite of missing data caused by partially obscuring the external alignment target 500, for example. Lidar sensor 206 can determine a location and orientation for an external alignment target 500 by determining the locations of the outside edges of the external alignment target 500 and the orientation of the front surface. The size and relationships between the four outer edges of the external alignment target along with the orientation of the front surface can be used to determine the six DoF pose of the external alignment target 500 with respect to a lidar sensor 206.

An external alignment target 500 can be used to perform initial alignment of sensors 116 included in a vehicle 110 by placing the external alignment target 500 in the field of view of vehicle sensors 116 and measuring a six DoF location and orientation of the external alignment target 500 with respect to each sensor 116. By comparing the six DoF pose of the sensors 116 determined based on processing external alignment target 500 and comparing the six DoF pose of each sensor 116 with the measured six DoF pose of the vehicle 110 with respect to the external alignment target 500, the six DoF pose of each sensor 116 with respect to the vehicle 110 and therefore each other can be determined. In practice, because a six DoF pose of vehicle 110 is determined based on data acquired by an IMU 400, a six DoF pose for lidar sensor 206, video sensors 204, and radar sensors 208 can be determined with respect to the IMU 400.

Correct operation of computing device 115 software that provides data for operation of a vehicle 110 can depend upon correct alignment data for sensors 116 that acquire data regarding the location of objects around a vehicle 110. Determining a correct pose including location and orientation for objects including vehicles and pedestrians around a vehicle 110 can depend upon determining similar six DoF pose data from more than one sensor. Problems can arise because sensors 116 can become misaligned during operation of a vehicle 110. Table 1 is a table of example requirements for sensor 116 alignment required by example object six DoF pose determination software. Table 1 includes IMU 400 to sensor 116 alignment requirements for sensors 116 including lidar sensor 206, video sensors 204, and radar sensors 208 in millimeters for x, y, and z and milliradians for roll, pitch, and yaw.

TABLE 1

IMU to sensor alignment requirements

|  | LIDAR | VIDEO | RADAR |
| --- | --- | --- | --- |
| IMU location | 1 mm | 1 mm | 1 mm |
| IMU orientation | 1 mrad | .597 mrad | 3 mrad |

Techniques described herein can align a vehicle sensor 116 to an IMU 400 sensor in a vehicle 110 while the vehicle is operating on a roadway to within the specifications listed in Table 1. Maintaining alignment for an FMCW lidar sensor 206 during vehicle operation can be a problem because FMCW lidar sensors 206 can include electro-mechanical components including one or more of galvanometers, rotating mirrors, and rotating prisms that scan an optical energy beam to sample data points across portions of an environment around a vehicle 110. These electro-mechanical components can be susceptible to mis-alignment caused by shocks and vibrations transmitted from the vehicle 110 via the mount that attaches the FMCW lidar sensor 206 to the vehicle 110. Techniques described herein can enhance the determination of six DoF pose for an FMCW lidar sensor 206 by determining a mis-alignment of the FMCW lidar sensor 206 with respect to an IMU 400 without requiring an external alignment target 500, stopping the vehicle 110 or requiring a clear field of view that does not have any objects including vehicles or pedestrians in the field of view of the FMCW lidar sensor 206. This permits the FMCW lidar sensor 206 to be re-aligned more often and more efficiently, enhancing the accuracy and quality of point cloud data acquired by the FMCW lidar sensor 206 and thereby enhancing the ability of a computing device 115 to operate a vehicle 110.

Techniques discussed herein measure relative radial velocity for a plurality of point cloud data points acquired by a FMCW lidar sensor 206. The point cloud data points are filtered to remove dynamic data points, i.e. data points generated by reflections from moving objects as opposed to static background data points. The static and dynamic data points can be acquired while the FMCW lidar sensor 206 is moving with respect to the static or background data points. The data points left after filtering out dynamic (moving object) data points are smoothed using a smoothing filter such as a Savitsky-Golay filter. The filtered data points are then processed to compute six DoF accelerations. The six DoF accelerations are processed to compute six DoF translations and rotations. The six DoF translations and rotations are compared to six DoF translations and rotations recorded by IMU 400. Use differences between FMCW lidar sensor 206 translations and rotations and IMU 400 translations and rotations to correct the alignment of FMCW lidar sensor 206.

FMCW lidar sensors 206 can measure relative radial velocity directly based on Doppler data. Another way to measure relative radial velocity with an FMCW lidar sensor 206 is to measure the same data point in two consecutive scans of the FMCW lidar sensor 206 and calculate the difference in location over time between the consecutive scans to calculate the velocity of the data point. In either example the FMCW lidar sensor 206 can be moving with respect to the static or background data points. The FMCW lidar sensor 206 data point accelerations can be determined by dividing the velocities by the time over which the velocity data was acquired, where acceleration of a FMCW lidar sensor 206 data point $\alpha_{lidar}$ is a function of the time base t, the distance to the data point α, and an angle θ of the FMCW lidar sensor 206 and is determined based on the velocity V according to the equation:

$$a_{lidar}(t, \alpha, \theta) = \frac{\Delta V}{\Delta t}. \qquad (1)$$

The six DoF acceleration of the FMCW lidar sensor 206 can be filtered to eliminate data points based on moving objects by filtering the FMCW lidar sensor 206 point cloud data to separate static from dynamic data points. Static data points are data points that correspond to data points from a non-moving background around a vehicle, for example data points corresponding to a roadway. Therefore, static data points maintain substantially a same location over time. Dynamic data points, i.e. data points that are moving with respect to the background, have a velocity, i.e., move over time, i.e., are at substantially different locations over time in contrast to static or background data points. For example, a vehicle moving in traffic in front of a vehicle 110 would generate dynamic data points while the roadway in front of the vehicle 110 would generate static data points.

FMCW lidar sensor 206 point cloud data can be filtered to determined which data points are static data points and which data points are dynamic data points based on filtering the point cloud data with a deep neural network. A deep neural network can be trained to identify objects including vehicles and pedestrians in FMCW lidar sensor 206 point cloud data. The deep neural network can be trained to segment the point cloud data based on shapes and locations of objects corresponding to vehicles and pedestrians in the FMCW lidar sensor 206 field of view. Segmenting an image is an image processing technique that can be performed by a deep neural network that identifies contiguous regions of data points corresponding to three-dimensional objects based on grouping data points according to their distance or range from an FMCW lidar sensor 206. In addition to segmenting the FMCW lidar sensor 206 point cloud data into background data points corresponding to static data points and moving objects corresponding to dynamic data points, the deep neural network can perform spatial filtering of data points near objects corresponding to dynamic data points detected in the point cloud data. The point cloud data can be spatially filtered by erosion, which is a filtering technique that filters out data points that border on detected objects to ensure that the remaining, unfiltered data points are static data points that can be converted to acceleration data via equation (1), above.

Prior to conversion to acceleration, the velocity data can be filtered with a Savitsky-Golay filter to remove random noise. A Savitsky-Golay filter uses a convolution kernel based on a polynomial function to filter random noise without distorting the signal, there by smoothing the data without changing the underlying function creating the signal. The velocity data is then converted to acceleration data $\alpha_{lidar}(t, \alpha, \theta)$ using equation (1), above. The acceleration data is then converted to six DoF pose data for the FMCW lidar sensor 206 using a transform function $f$ applied to the accelerations to determine six DoF translations in and rotations by the equation:

$$f(a_{lidar}(t, \alpha, \theta)) = \begin{bmatrix} t_x & t_y & t_z \\ r_x & r_y & r_z \end{bmatrix}_{lidar}. \qquad (2)$$

Translations $t_x$, $t_y$, $t_z$ are translations along the x, y, and z axes and $r_x$, $r_y$, $r_z$ are the rotations about the x, y, and z axes corresponding to roll, pitch, and yaw. The transform function $f$ that converts accelerations into six DoF translations and rotations can be calculated by training a deep neural network using ground truth generated by running a finite element analysis (FEA) simulation of a FMCW lidar sensor 206 to simulate translations and rotations of the FMCW lidar sensor 206 under varying load impulse or vibration modes. The results of the finite element analysis can be validated by physically applying loads and vibrations to a FMCW lidar sensor 206 and measuring six DoF translations and rotations empirically. Six DoF translations and rotations of an IMU 400 based on accelerations output by the IMU 400 can be determined by a similarly trained second deep neural network. The ground truth for training the second deep neural network could come from FEA simulation or empirical data from and IMU 400 and could be calculated by transforming IMU 400 accelerations $\alpha_{IMU}(t, \alpha, \theta)$, according to the equation:

$$f(a_{IMU}(t, \alpha, \theta)) = \begin{bmatrix} t_x & t_y & t_z \\ r_x & r_y & r_z \end{bmatrix}_{IMU} \quad (3)$$

where t, α, θ are the time base, acceleration, and angle of the IMU 400, respectively and $f$ is the transfer function calculated by the second deep neural network. The notations for translations and rotations are the same as discussed above in relation to equation (2) applied to the IMU 400.

In this fashion, accelerations measured by both the FMCW lidar sensor 206 and the IMU 400 can be transformed into six DoF translations and rotations, permitting a difference between the respective translations and rotations to be calculated by the equation:

$$\begin{bmatrix} t_x & t_y & t_z \\ r_x & r_y & r_z \end{bmatrix}_{lidar^*} = \begin{bmatrix} t_x & t_y & t_z \\ r_x & r_y & r_z \end{bmatrix}_{lidar} - \begin{bmatrix} t_x & t_y & t_z \\ r_x & r_y & r_z \end{bmatrix}_{IMU}. \quad (4)$$

The label lidar* refers to the determined mis-alignment of the FMCW lidar sensor 206. The reason that corrected translations and rotations are used rather than just measuring translations and rotations on the IMU 400 and applying them to the FMCW lidar sensor 206 is that, although it can be assumed the same G forces or accelerations and vibrations are applied to the FMCW lidar sensor 206 and the IMU 400 by forces acting on the vehicle 110 as it operates on the roadway, the effects of forces on the sensor 206 and IMU 400 will be different because the FMCW lidar sensor 206 and the IMU 400 are mounted at different locations in the vehicle 110 and as a result have varying stiffness and damping of the structures upon which they are mounted and will therefore react differently to the same shock and vibrations. The transfer functions account for differences in varying stiffness of vehicle structures upon which the FMCW lidar sensor 206 and the IMU 400 are mounted. The transfer functions in equations (2) and (3) compensate for the differences affecting the translations and rotations of the respective sensors. Applying the mis-alignment lidar* translations and rotations calculated by the above techniques to point cloud data acquired by the FMCW lidar sensor 206 will correct for dynamic mis-alignment without requiring an external alignment target 500 or otherwise interrupting the operation of a vehicle 110, and thereby will enhance alignment of an FMCW lidar sensor 206 by enhancing the calculation of mis-alignment according to the above equations (1)-(4).

Figure 6:
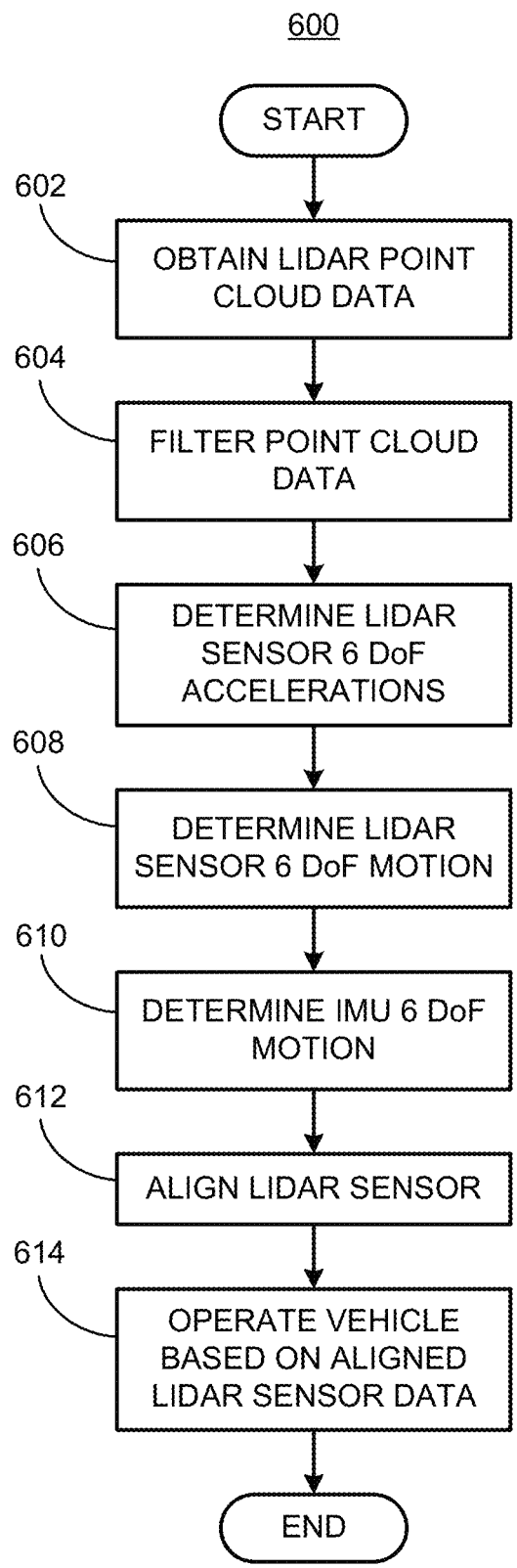
FIG. 6 is a flowchart diagram of an example process to operate a vehicle using an aligned lidar sensor.

FIG. 6 is a flowchart diagram of a process 600 described in relation to FIGS. 1-4, of a process 600 for operating a vehicle based on aligned FMCW lidar sensor data. Process 600 can be implemented by a processor of computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins a block 602, where a computing device 115 in a vehicle acquires FMCW lidar sensor 206 point cloud velocity data as discussed above in relation to FIG. 5.

At block 604 the FMCW lidar sensor 206 point cloud data is filtered into static and dynamic data using a deep neural network as discussed above in relation to FIG. 5.

At block 606 the FMCW lidar sensor 206 point cloud velocity data is converted into accelerations as discussed above in relation equation (1).

At block 608 the FMCW lidar sensor 206 acceleration data is converted into six DoF translation and rotation data according to equation (2), above.

At block 610 IMU 400 acceleration data is converted into six DoF translation and rotation data according to equation (3), above.

At block 612 IMU 400 six DoF translation and rotation data is subtracted from FMCW lidar sensor 206 six DoF translation and rotation data according to equation (4), above to form corrected FMCW lidar sensor 206 translation and rotation data to be used to correct mis-alignment of the FMCW lidar sensor 206.

At block 614 a computing device 115 in a vehicle 110 uses the corrected FMCW lidar sensor data 206 to operate the vehicle 110. For example, computing device 115 can identify and locate an object, including a vehicle or a pedestrian in corrected FMCW lidar sensor data 206. Computing device 115 can determine corresponding objects in video and radar data and based on the correspondence, determine a vehicle path upon which to operate the vehicle 110, where the vehicle path is a polynomial function. The computing device 115 can issue commands to controllers 112, 113, 114 to operate vehicle 110 powertrain, steering and brakes to operate vehicle 110 along the vehicle path formed by the determined polynomial function. Following block 614 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a processor; and
a memory, the memory including instructions executable by the processor to:
   obtain velocity lidar point cloud data acquired with a frequency modulated continuous wave (FMCW) lidar sensor, wherein the velocity lidar point cloud data includes a speed with which a data point is moving with respect to the FMCW lidar sensor;
   filter the velocity lidar point cloud data to select static velocity data points, wherein the static velocity data points each correspond to a point on a roadway around a vehicle;
   determine FMCW lidar sensor accelerations in six degrees of freedom based on the static velocity data points;
   determine FMCW lidar sensor rotations and translations in six degrees of freedom based on the FMCW lidar sensor accelerations in six degrees of freedom;
   determine vehicle rotations and translations in six degrees of freedom based on inertial measurement unit (IMU) data;
   determine FMCW lidar sensor mis-alignment based on differences between the FMCW lidar sensor rotations and translations and the vehicle rotations and translations;
   align the FMCW lidar sensor based on the FMCW lidar sensor mis-alignment; and
   operate the vehicle based on the aligned FMCW lidar sensor.

2. The computer of claim 1, the instructions including further instructions to acquire velocity lidar point cloud data based on a doppler shift.

3. The computer of claim 1, the instructions including further instructions to acquire the velocity lidar point cloud data based on acquiring two data points from a location in an environment around the FMCW lidar sensor at different times to measure acceleration.

4. The computer of claim 1, the instructions including further instructions to filter the velocity lidar point cloud data to select the static velocity data points based on providing the velocity lidar point cloud data to a first neural network.

5. The computer of claim 4, the instructions including further instructions to select the static velocity data points by filtering out dynamic data points using a second neural network where the dynamic data points are data points acquired from objects that are moving with respect to a background.

6. The computer of claim 5, the instructions including further instructions to filter out dynamic data points by performing spatial filtering of data points on or near a moving object with the second neural network.

7. The computer of claim 1, the instructions including further instructions to filter the static velocity data points based on processing the static velocity data points with a Savitzky-Golay filter to smooth the static velocity data, wherein the Savitzky-Golay filter convolves the velocity data points with a polynomial function.

8. The computer of claim 1, the instructions including further instructions to determine the FMCW lidar sensor rotations and translations in six degrees of freedom, and the vehicle rotations and translations based on transfer functions determined based on finite element analysis simulations of FMCW lidar sensor and simulated vehicle rotations and translations under varying load inputs with varying vibration modes.

9. The computer of claim 8, the instructions including further instructions to implement the transfer functions with a second neural network.

10. The computer of claim 1, wherein the transfer functions account for differences in varying stiffness of vehicle structures upon which the FMCW lidar sensor and the IMU are mounted.

11. The computer of claim 1, the instructions including further instructions to operate the vehicle by determining a vehicle path based on point cloud data obtained from the aligned FMCW lidar sensor.

12. The computer of claim 11, the instructions including further instructions to operate the vehicle by controlling vehicle powertrain, vehicle steering and vehicle brakes to cause the vehicle to travel along the vehicle path.

13. A method, comprising:
   obtaining velocity lidar point cloud data acquired with a frequency modulated continuous wave (FMCW) lidar sensor wherein the velocity lidar point cloud data includes a speed with which a data point is moving with respect to the FMCW lidar sensor;
   filtering the velocity lidar point cloud data to select static velocity data points, wherein the static velocity data points each correspond to a point on a roadway around a vehicle;
   determining FMCW lidar sensor accelerations in six degrees of freedom based on the static velocity data points;
   determining FMCW lidar sensor rotations and translations in six degrees of freedom based on the FMCW lidar sensor accelerations in six degrees of freedom;

determining vehicle rotations and translations in six degrees of freedom based on inertial measurement unit (IMU) data;

determining FMCW lidar sensor mis-alignment based on differences between the FMCW lidar sensor rotations and translations and the vehicle rotations and translations;

aligning the FMCW lidar sensor based on the FMCW lidar sensor mis-alignment; and operating the vehicle based on the aligned FMCW lidar sensor.

14. The method of claim 13, further comprising acquiring velocity lidar point cloud data based on a doppler shift.

15. The method of claim 13, further comprising acquiring the velocity lidar point cloud data based on acquiring two data points from a location in an environment around the FMCW lidar sensor at different times to measure acceleration.

16. The method of claim 13, further comprising filtering the velocity lidar point cloud data to select the static velocity data points based on providing the velocity lidar point cloud data to a first neural network.

17. The method of claim 16, further comprising selecting the static velocity data points by filtering out dynamic data points using a second neural network where the dynamic data points are data points acquired from objects that are moving with respect to a background.

18. The method of claim 17, further comprising filtering out dynamic data points by performing spatial filtering of data points on or near a moving object with the second neural network.

19. The method of claim 13, further comprising filtering the static velocity data points based on processing the static velocity data points with a Savitzky-Golay filter to smooth the static velocity data, wherein the Savitzky-Golay filter convolves the velocity data points with a polynomial function.

20. The method of claim 13, further comprising determining the FMCW lidar sensor rotations and translations in six degrees of freedom, and the vehicle rotations and translations based on transfer functions determined based on finite element analysis simulations of FMCW lidar sensor and simulated vehicle rotations and translations under varying load inputs with varying vibration modes.

* * * * *